(12) United States Patent
Matsui et al.

(10) Patent No.: US 6,754,561 B2
(45) Date of Patent: Jun. 22, 2004

(54) OBJECT STATE SENSING APPARATUS, OBJECT STATE SENSING METHOD, HOME ELECTRONIC APPLIANCE, NETWORK ADAPTER AND MEDIUM

(75) Inventors: Masaru Matsui, Katano (JP); Shigeaki Matsubayashi, Sakai (JP); Sachio Nagamitsu, Kyoto (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 10/148,012

(22) PCT Filed: Sep. 25, 2001

(86) PCT No.: PCT/JP01/08285
§ 371 (c)(1),
(2), (4) Date: Oct. 1, 2002

(87) PCT Pub. No.: WO02/29749
PCT Pub. Date: Apr. 11, 2002

(65) Prior Publication Data
US 2003/0112139 A1 Jun. 19, 2003

(30) Foreign Application Priority Data
Sep. 26, 2000 (JP) ........................................ 2000-292575

(51) Int. Cl.[7] ........................... G08B 21/00; G08B 21/22
(52) U.S. Cl. ..................... 700/277; 340/573.1; 340/501
(58) Field of Search .............................. 700/19, 20, 47, 700/276, 277; 340/501, 517, 521, 522, 573.1; 367/93; 165/11.1, 200, 205, 208, 237

(56) References Cited

U.S. PATENT DOCUMENTS

| | | | | |
|---|---|---|---|---|
| 5,416,725 A | * | 5/1995 | Pacheco et al. | 364/514 |
| 5,519,784 A | * | 5/1996 | Vermeulen et al. | 382/100 |
| 5,544,809 A | * | 8/1996 | Keating et al. | 236/44 |
| 5,682,949 A | * | 11/1997 | Ratcliffe et al. | 165/209 |
| 5,819,840 A | * | 10/1998 | Wilson et al. | 165/11.1 |
| 5,909,378 A | * | 6/1999 | De Milleville | 364/528.11 |
| 5,933,085 A | * | 8/1999 | Holcomb et al. | 340/825.31 |
| 6,078,253 A | * | 6/2000 | Fowler | 340/501 |
| 6,263,260 B1 | * | 7/2001 | Bodmer et al. | 700/275 |
| 2003/0214420 A1 | * | 11/2003 | Matsui et al. | 340/870.16 |

FOREIGN PATENT DOCUMENTS

| | | | | |
|---|---|---|---|---|
| JP | 06-230144 | | 8/1994 | |
| JP | 06230144 A | * | 8/1994 | ............ G01V/9/04 |
| JP | 07-312775 | | 11/1995 | |
| JP | 11-132530 | | 5/1999 | |

OTHER PUBLICATIONS

International search report for PCT/JP01/08285 dated Jan. 15, 2002.
English translation of Form PCT/ISA/210.
T. Kohonen, "Self–Organization and Associative Memory, Chapter 5, Self–Organizing Feature Maps", Springer–Verlag, Berlin Heidelberg, New York Tokyo, 1984, pp. 125–139.

* cited by examiner

Primary Examiner—Leo Picard
Assistant Examiner—Sean P. Shechtman
(74) Attorney, Agent, or Firm—RatnerPrestia

(57) ABSTRACT

In a room exit determination, a determination of presence of a body in a room is made if a movement pattern vector consisting of a room ID of movement origin, a room ID of movement destination and a movement period of time is not received from the a non-specified room response sensor within a predetermined period of time. A determination of exit from the room of a body is made only when the movement period of time in the movement pattern vector agrees with a movement period of time of past exits from the room stored in the a movement time storage if this vector is received from the non-specified room response sensor.

16 Claims, 6 Drawing Sheets

OBJECT STATE SENSING APPARATUS, OBJECT STATE SENSING METHOD, HOME ELECTRONIC APPLIANCE, NETWORK ADAPTER AND MEDIUM

THIS APPLICATION IS A U.S. NATIONAL PHASE APPLICATION OF PCT INTERNATIONAL APPLICATION PCT/JP01/08285.

TECHNICAL FIELD

The present invention relates to an object state sensing apparatus, an object state sensing method, a home electronic appliance, a network adapter and a medium that are effective in sensing an object, such as a human body, in each room of a house.

BACKGROUND TECHNOLOGY

As for a conventional method of sensing the existence of a person in a room, there is the well-known system wherein one tremor sensing-type human body sensor is installed on, for example, on a ceiling so that human body sensing is carried out according to the movement of a person who has come into a room. This system has a problem wherein the human body sensor cannot sense a person in a room in the case that the person is stationery when reading, sleeping, or the like, and cannot detect the person's presence. That is to say, the sensor cannot distinguish the case wherein the person in the room is stationary from the case wherein the person has actually left the room, although the system can be built at a low cost because the tremor sensing-type human body sensor is inexpensive.

As a method for solving the above described problem, there is the well-known technology in Japanese unexamined patent publication H6 (1994)-230144, for example.

FIG. 6 shows a configuration view of the technology described in Japanese unexamined patent publication H6 (1994)-230144. Human body sensors are denoted as 1010 and 1020, wherein 1010 has a view of an entrance to a room while 1020 has a view of the inside of the room, and it is necessary for the respective sensing ranges to be determined so as not to overlap. Human body sensing information generation parts that sense the existence of responses of the two human body sensors and which output human body sensing information are denoted as 1030 and 1040. In addition, a determination part for determining if a person has left based on the human body sensing information received from the human body sensing information generation parts 1030 and 1040 is denoted as 1050.

The operation thereof is described in the following. The human body sensing information generation parts 1030 and 1040 output "1" in the case that there is a response and "0" in the case that there is no response, according to the existence of a response of the human body sensors 1010 and 1020. The room exit determination part 1050 monitors the output history of the human body sensing information generation parts 1030 and 1040 and determines that a person has left a room in the case of the occurrence of a certain sequence of response histories as shown in Table 1.

TABLE 1

| activity | stationary in room | moving in room | starting to exit room | passing through entrance |
| --- | --- | --- | --- | --- |
| response of 1010 | 0 | 0 | 1 | 1 |
| response of 1020 | 0 | 1 | 1 | 0 |
| determination | present in room | present in room | present in room | absent from room |

As described above, in the human body sensing system described in Japanese unexamined patent publication H6 (1994)-230144, two tremor sensing-type human body sensors having views of the entrances to one room and the inside of the room respectively are installed on the ceiling of the room so that the entrances into and exits out of the room can be monitored according to the chronological history of the responses of the two sensors and, therefore, the exits out of the room can be clearly sensed resulting in an increase in the precision of human body sensing.

In addition, as a technology similar to that of Japanese unexamined patent publication H6 (1994)-230144, there is a method of improving the precision of human body sensing by installing tremor sensing-type human body sensors on the ceiling of each room, in corridors outside of rooms, in hallways, or the like, and by using the same method as in Japanese unexamined patent publication H6 (1994)-230144.

However, there is a problem wherein disadvantage arises in cost in the case that the above described conventional human body sensing system is desired to be applied to a house having a plurality of rooms. For example, in a house having a layout of four rooms surrounding a corridor, the number of human body sensors required is two/each room×four rooms=eight according to the technology in Japanese unexamined patent publication H6 (1994)-230144 and one/each room×four rooms+one in corridor=five, at a minimum, according to the above described technology similar to that of Japanese unexamined patent publication H6 (1994)-230144.

That is to say, there is a problem wherein disadvantage arises in cost because the required number of human body sensors becomes large in conventional human body sensing systems.

DISCLOSURE OF THE INVENTION

The present invention takes the problem with the conventional human body sensing system into consideration and a purpose thereof is to provide an object state sensing apparatus, an object state sensing method, a home electronic appliance, a network adapter and a medium with a high precision of human body sensing by a small number of sensors wherein one human body sensor per room is installed; in the above case one per room×four rooms=four human body sensors, for example, are installed, and wherein pattern of movement, including time for moving between rooms, is learned and, in the case that a response of a human body sensor in one room ceases to be detected, the human body sensing information of all of the other rooms is monitored so as to extract the pattern of movement, so that whether or not the person has exited is determined based on the degree of similarity between the extracted pattern of movement and the learned pattern of movement.

That is to say, a purpose of the present invention is to provide an object state sensing apparatus, an object state sensing method, a home electronic appliance, a network adapter and a medium that have a high precision of human body sensing despite the use of a small number of sensors.

To solve the above-described problems, One aspect of the present invention is an object state sensing apparatus comprising:
  a state sensing information generation part for generating state sensing information showing the state of an object in two, or more, predetermined regions by means of moving body sensors, at least one of which is installed in each of said predetermined regions, for sensing the movement of said object; and
  a determination part for specifying a predetermined region wherein said state sensing information has changed and for determining the state of said object in said specified predetermined region by utilizing said state sensing information of a predetermined region that is different from the specified predetermined region.

Another aspect of the present invention is the object state sensing apparatus,
  wherein said two, or more, predetermined regions are respective rooms within a house,
  wherein said condition sensing information is information showing either the sensed condition wherein said object is sensed or the non-sensed condition wherein said object is not sensed,
  wherein said condition sensing information generation part generates said condition sensing information of each of said rooms from the existence of a response of a moving body sensor of each of said rooms, and
  wherein said determination part has a condition sensing information change monitoring part for specifying a room, from among the respective rooms within said house, wherein said condition sensing information has changed from the sensed condition to the non-sensed condition.

Still another aspect of the present invention (corresponding to claim 3) is the object state sensing apparatus according to the 2nd invention, wherein said determination part comprises:
  a non-specified room response sensing part for finding a movement pattern which is a pattern with respect to the movement between the respective rooms by checking, in the case that said state sensing information change monitoring part has specified a room wherein said state sensing information has changed from the sensed state to the non-sensed state, the state sensing information of a room other than said specified room; and
  a room exit determination part for determining whether, or not, the object has exited from said specified room by comparing said found movement pattern to a reference pattern that is a pattern checked in advance and that is a pattern with respect to the movement between the respective rooms.

Yet still another aspect of the present invention is the object state sensing apparatus, characterized in that
  said non-specified room response sensing part assumes the room, where said state sensing information has converted to the sensed state from the non-sensed state within a predetermined period of time since the time when said specified room is specified, to be a movement destination room and assumes the period of time from the time when said room is specified to the time when said movement destination room is converted to the sensed state to be a movement period of time, and in that
  said movement pattern includes an ID of said specified room, an ID of said movement destination room and said movement period of time.

Still yet another aspect of the present invention is the object state sensing apparatus, characterized in that
  said reference pattern includes the ID of said specified room, the ID of said movement destination room and a period of time, measured in advance, required for the object to move from said specified room to said movement destination room and in that
  said determination means to determine that said object has exited from the room in the case that said movement period of time of said movement pattern is substantially equal to said period of time, which is measured in advance, of said reference pattern corresponding to said movement pattern.

A further aspect of the present is the object state sensing apparatus, characterized in that
  said reference pattern includes the probability of said object exiting from said specified room with respect to said movement pattern and in that
  said determination means to determine that said object has exited from the room in the case that said probability of said reference pattern corresponding to said movement pattern is greater than a predetermined value.

A still further aspect of the present invention is the object state sensing, characterized by comprising a movement pattern learning part for learning said movement pattern,
  wherein said reference pattern is a result of learning in said movement pattern learning part and
  wherein said determination means to determine based on a learning value corresponding to said movement pattern.

A yet further aspect of the present invention is the object state sensing, wherein said movement pattern learning part learns in said manner by means of a self-organizing algorithm.

A still yet further aspect of the present invention is the object state sensing apparatus, wherein said reference pattern corresponding to said movement pattern is a reference pattern specified by the ID of said specified room and by the ID of said movement destination room.

An additional aspect of the present invention is the object state sensing apparatus,
  wherein said two, or more, predetermined regions are respective rooms within a house,
  wherein said condition sensing information is information showing either the sensed condition wherein said object is sensed or the non-sensed condition wherein said object is not sensed,
  wherein said condition sensing information generation part generates said condition sensing information of each of said rooms from the existence of a response of a moving body sensor of each of said rooms, and
  wherein said determination part has a condition sensing information change monitoring part for specifying a room, from among the respective rooms within said house, wherein said condition sensing information has changed from the non-sensed condition to the sensed condition.

In addition, a still additional aspect of the invention is an object state sensing apparatus wherein the above described determination part is provided with non-specified room response sensing part for checking the state sensing information of the rooms other than a specified room in the case that the above described state sensing information change monitoring part specifies the room wherein the above described state sensing information has changed from the non-sensed state to the sensed state, so as to detect a pattern of movement that is a pattern with respect to movement between the respective rooms; and a room entrance determination part for determining whether or not the object has entered into the above described specified room by comparing the above described detected pattern of movement and a pre-checked pattern, which is a reference pattern of a pattern with respect to movement between the respective rooms. The present invention may be the first related invention.

In addition, a yet additional aspect of the invention is an object state sensing apparatus characterized in that the above described non-specified room response sensing part assumes a room wherein the above described state sensing information has converted from the sensed state to the non-sensed state during the period of time from a predetermined past time to the time when the above described specified room is specified to be a room of movement origin and assumes the period of time from the time when the above described room of movement origin has converted to the non-sensed state to the above described specified time to be the period of time of movement and in that the above described pattern of movement includes an ID of the above described specified room, an ID of the above described room of movement origin and the above described period of time of movement. The present invention may be the second related invention.

In addition, a still yet additional aspect of invention is an object state sensing apparatus characterized in that the above described reference pattern includes an ID of the above described specified room, an ID of the above described room of movement origin and the period of time measured in advance that is required for the object to move from the above described room of movement origin to the above described specified room and in that the above described determination indicates to determine that the object has entered the room in the case that the above described period of time of movement of the above described pattern of movement and the above described period of time measured in advance of the above described reference pattern corresponding to the above described pattern of movement are substantially equal. The present invention may be the third related invention.

In addition, a supplementary aspect of the invention is an object state sensing apparatus, characterized in that the above described reference pattern includes the probability of the above described object exiting the above described room, which corresponds to the above described pattern of movement and in that the above described determination indicates to determine that the above described object has entered the room in the case that the above described probability of the above described reference pattern corresponding to the above described pattern of movement is greater than a predetermined value. The present invention may be the fourth related invention.

In addition, a still supplementary aspect of the is an object state sensing apparatus, characterized by comprising a movement pattern learning part that learns the above described pattern of movement, wherein the above described reference pattern is a learning result in the above described movement pattern learning part and wherein the above described determination indicates to make a determination based on the learning value corresponding to the above described pattern of movement. The present invention may be the fifth related invention.

In addition, a yet supplementary aspect of the invention is an object state sensing apparatus wherein the above described movement pattern learning part learns the above described pattern of movement according to a self-organizing algorithm. The present invention may be the sixth related invention.

In addition, a still yet supplementary aspect of the invention is an object state sensing apparatus, wherein the above described reference pattern corresponding to the above described pattern of movement is a reference pattern specified by the above described ID of the specified room and the above described ID of the room of movement origin. The present invention may be the seventh related invention.

Another aspect of the present invention is a home electronic appliance comprising:

an object state sensing apparatus; and a control part for changing the operational condition of said home electronic appliance in the case that said determination part determines that said object has exited from said specified room.

Still another aspect of the present invention is the home electronic, wherein said home electronic appliance is an air conditioner.

Yet still another aspect of the present invention is the home electronic, wherein said control part changes the operational condition of said home electronic appliance in said specified room to a first operational condition in the case that said determination part determines that said object has exited from said specified, wherein said control part changes the operational condition of said home electronic appliance to a second operational condition that is different from said first operational condition in the case that said state sensing information in said specified room has been in the condition of non-sensed for a predetermined period of time, or longer, since said determination is made that exist from the room has occurred, and wherein said control part makes the operational condition of said home electronic appliance to return to the operational condition before the change to said first operational condition in the case that said state sensing information of said specified room is converted from the non-sensed state to the sensed state within said predetermined period of time.

Still yet another aspect of the present invention is a network adapter comprising:

an object state sensing;

said moving body sensor; and a communication part for communicating with a home electronic appliance having a function part that performs predetermined functions based on a determination result of said object state sensing apparatus.

A further aspect of the present invention is the network adapter, comprising a control part for changing the operational condition of said function part in the case that said determination part determines that said object has exited from said specified room.

A still further aspect of the present invention is the network adapter, wherein said control part changes the operational condition of said function part in said specified room to a first operational condition in the case that said determination part determines that said object has exited from said specified room, wherein said control part changes the operational condition of said function part to a second operational condition that is different from said first operational condition in the case that said state sensing information in said specified room has been in the condition of non-sensed for a predetermined period of time, or longer, since said determination is made that exist from the room has occurred, and wherein said control part makes the operational condition of said function part to return to the operational condition before the change to said first operational condition in the case that said state sensing information of said specified room is converted from the non-sensed state to the sensed state within said predetermined period of time.

A yet further aspect of the present invention is an object state sensing method comprising:

the state sensing information generation step of generating state sensing information showing the state of an object in two, or more, predetermined regions by means of moving body sensors, at least one of which is installed in each of said predetermined regions, for sensing the movement of said object; and the determination step of specifying a predetermined region wherein said state sensing information has changed and of determining the state of said object in said specified predetermined region by utilizing said state sensing information of a predetermined region that is different from the specified predetermined region.

A still yet further aspect of the present invention is the object state sensing, wherein said two, or more, predetermined regions are respective rooms within a house, wherein said condition sensing information is information showing either the sensed condition wherein said object is sensed or the non-sensed condition wherein said object is not sensed, wherein said condition sensing information generation step generates said condition sensing information of each of said rooms from the existence of a response of a moving body sensor of each of said rooms, and wherein said determination step has the condition sensing information change monitoring step of specifying a room, from among the respective rooms within said house, wherein said condition sensing information has changed from the sensed condition to the non-sensed condition.

An additional aspect of the present invention is the object state sensing method, wherein said determination step has:

the non-specified room response sensing step of finding a movement pattern which is a pattern with respect to the movement between the respective rooms by checking, in the case that a room has been specified in said state sensing information change monitoring step, the state sensing information of a room other than said specified room; and the room exit determination step of determining whether, or not, the object has exited from said specified room by comparing said found movement pattern to a reference pattern that is checked in advance and that is a pattern with respect to the movement between the respective rooms.

A still additional aspect of the present invention is the object state sensing, wherein said two, or more, predetermined regions are respective rooms within a house, wherein said condition sensing information is information showing either the sensed condition wherein said object is sensed or the non-sensed condition wherein said object is not sensed, wherein said condition sensing information generation step generates said condition sensing information of each of said rooms from the existence of a response of a moving body sensor of each of said rooms, and wherein said determination step has the condition sensing information change monitoring step of specifying a room, from among the respective rooms within said house, wherein said condition sensing information has changed from the non-sensed condition to the sensed condition.

In addition, the a yet additional aspect of the invention is an object state sensing method wherein the above described determination step has the non-specified room response sensing step of checking the state sensing information of the rooms other than of a specified room in the case that the above described state sensing information change monitoring step specifies the room wherein the above described state sensing information has changed from the non-sensed state to the sensed state so as to detect a pattern of movement that is a pattern with respect to movement between the respective rooms and the room entrance determination step of determining whether or not the object has entered the above described specified room by comparing the above described detected pattern of movement to a reference pattern that is a checked in advance and is a pattern with respect to the movement between the respective rooms.

A still yet additional aspect of the present invention is a medium that can be processed by a computer and that is a medium for holding a program that allows a computer to implement the entirety of, or part of the state sensing information generation step of generating state sensing information showing the state of an object in two, or more, predetermined regions by means of moving body sensors, at least one of which is installed in each of said predetermined regions, for sensing the movement of said object; and the determination step of specifying a predetermined region wherein said state sensing information has changed and of determining the state of said object in said specified predetermined region by utilizing said state sensing information of a predetermined region that is different from the specified predetermined region in the object state sensing.

A supplementary aspect of the present invention is a medium that can be processed by a computer and that is a medium for holding a program that allows a computer to implement the entirety of, or part of the state sensing information generation step of generating state sensing information showing either the sensed state wherein said object is sensed or the non-sensed state wherein said object is not sensed in each of said rooms from the existence of a response of a moving body sensor in each of said rooms and the determination step of specifying a room, from among the respective rooms within said house, wherein said state sensing information has changed from the sensed state to the non-sensed state and of determining the state of said object in said specified room by utilizing said state sensing information of a room that is different from the specified room in the object state sensing.

Another aspect of the present is a medium that can be processed by a computer and that is a medium for holding a program that allows a computer to implement the entirety of, or part of the state sensing information generation step of generating state sensing information showing either the sensed state wherein an object is sensed or the non-sensed state wherein said object is not sensed in each of the rooms within a house from the existence of a response of a moving body sensor from among the moving body sensors for sensing said object, at least one of which is installed in each of said rooms, the human body sensing information change monitoring step of specifying a room, from among the respective rooms within said house, wherein said state sensing information has changed from the sensed state to the non-sensed state, the non-specified room response sensing step of checking the state sensing information of a room other than said specified room in the case that the room is specified in said human body sensing information change monitoring step so that a movement pattern that is a pattern with respect to the movement between the respective rooms is found and the room exit determination step of determining whether, or not, the object has exited from said specified room by comparing said found movement pattern to a reference pattern that is a pattern checked in advance and that is a pattern with respect to the movement between the respective rooms in the object state sensing method.

Still another aspect of the present invention is a medium that can be processed by a computer and that is a medium for holding a program that allows a computer to implement the entirety of, or part of the state sensing information generation step of generating state sensing information showing either the sensed state wherein said object is sensed or the non-sensed state wherein said object is not sensed in each of said rooms from the existence of a response of a moving body sensor in each of said rooms and the determination step of specifying a room, from among the respective rooms within said house, wherein said state sensing information has changed from the non-sensed state to the sensed state and of determining the state of said object in said specified room by utilizing said state sensing information of a room that is different from the specified room in the object state sensing method.

In addition, yet still another aspect of the invention is a medium in the object state sensing method that holds a program for allowing a computer to implement the entirety of, or a portion of, the state sensing information generation step of generating state sensing information that shows, for each of the above described rooms, either the sensed state wherein the above described object has been sensed or the non-sensed state wherein the above described object has not been sensed from the existence of responses of the above described moving body sensor of each of the above described rooms by means of at least one moving body sensor installed in each of the rooms of a house so as to sense the object;

the human body sensing information change monitoring step of specifying a room wherein the above described state sensing information has changed from the non-sensed state to the sensed state from among the respective rooms of the above described house;

the non-specified room response sensing step of checking the state sensing information of the rooms other than the above described specified room in the case that the room is specified in the above described human body sensing information change monitoring step so as to detect the pattern of movement that is the pattern with respect to the movement between the respective rooms; and the room entrance determination step of determining if the object has entered into the above described specified room by comparing the above described detected pattern of movement and a reference pattern that is checked in advance and is a pattern with respect to the movement between the respective rooms in the object state sensing method of the eighth related invention.

In addition, still yet another aspect of the invention is a program in the object state sensing method for allowing a computer to implement the entirety of, or a portion of, the state sensing information generation step of generating the state sensing information that shows the state of objects in each of two, or more, predetermined regions by means of at least one moving body sensor of sensing the movement of the object, installed in the above described predetermined region so as and the determination step of specifying a predetermined region wherein the above described state sensing information has changed and of determining the state of the above described object in the above described specified predetermined region by utilizing the above described state sensing information of a predetermined region that differs from the specified predetermined region in the object state sensing method.

In addition, a further aspect of the invention is a program in the object state sensing method for allowing a computer to implement the entirety, or a portion of, the state sensing information generation step of generating the state sensing information that shows, for each of the above described rooms, either the sensed state wherein the above described object is sensed or the non-sensed state wherein the above described object is not sensed from the existence of the response of a moving body sensor in each of the above described rooms; and the determination step of specifying a room wherein the above described state sensing information has converted from the sensed state to the non-sensed state from among the respective rooms of the above described house and of determining the state of the above described object in the above described specified room by utilizing the above described state sensing information of the rooms other than the specified room.

In addition, a still further aspect of the invention is a program in the object state sensing method for allowing a computer to implement the entirety of, or a portion of, the state sensing information generation step of generating the state sensing information that shows, for each room of a house, either the sensed state wherein the above described object is sensed or the non-sensed state wherein the above described object is not sensed from the existence of a response of at least one moving body sensor in each of the above described rooms by means of the above described moving body sensor installed in each of the above described rooms so as to sense the object;

the human body sensing information change monitoring step of specifying a room wherein the above described state sensing information has changed from the sensed state to the non-sensed state from among the respective rooms of the above described house;

the non-specified room response sensing step of checking the state sensing information of the rooms other than a specified room in the case that the room is specified in the above described human body sensing information change monitoring step so as to detect the pattern of movement that is the pattern with respect to the movement between the respective rooms; and the room exit determination step of determining whether or not the object has exited from the above described specified room by comparing the above described detected pattern of movement to a reference pattern that is a pattern checked in advance and is a pattern with respect to the movement between the respective rooms.

In addition a yet further aspect of the invention is a program in the object state sensing method for allowing a computer to implement the entirety of, or a portion of, the state sensing information generation step of generating the state sensing information that shows, for each room, either the sensed state wherein the above described object is sensed or the non-sensed state wherein the above described object is not sensed from the existence of the response of the moving body sensor in each of the above described rooms; and the determination step of specifying a room wherein the above described state sensing information has changed from the non-sensed state to the sensed state from among the respective rooms of the above described house and of determining the state of the above described object in the above described specified room by utilizing the above described state sensing information of the rooms other than the specified room.

In addition, a still yet further aspect of the invention is a program in the object state sensing method for allowing a computer to implement the entirety of, or a portion of, the state sensing information generation step of generating the state sensing information that shows, for each room of a house, either the sensed state wherein the above described object is sensed or the non-sensed state wherein the above described object is not sensed from the existence of a response of at least one moving body sensor in each of the above described rooms by means of the above described moving body sensor installed in each of the above described rooms so as to sense the object;

the human body sensing information change monitoring step of specifying a room wherein the above described state sensing information has changed from the sensed state to the non-sensed state from among the respective rooms of the above described house;

the non-specified room response sensing step of checking the state sensing information of the rooms other than a specified room in the case that the room is specified in the above described human body sensing information change monitoring step so as to detect the pattern of movement that is the pattern with respect to the movement between the respective rooms; and the room entrance determination step of determining whether or not the object has entered to the above described specified room by comparing the above described detected pattern of movement to a reference pattern that is checked in advance and is a pattern with respect to the movement between the respective rooms.

An additional aspect of the invention may be, for example, a human body sensing system characterized by comprising: a plurality of human body sensors, at least one per room, installed in all of the rooms of a house; a human body sensing information generating part that generates human body sensing information of each of the rooms by obtaining the existence of responses of the human body sensor in each of the rooms; a human body sensing information change monitoring part that acquires an absence sensed time from a timer in the case that the human body sensing information in room m has changed from existence to absence and that outputs a room ID that represents the above described room m and the above described absence sensed time; a non-specified room response sensing part that monitors the human body sensing information of the rooms other than the above described room m for a predetermined period of time in the case that the above described room ID of room m and the above described absence sensed time from the above described human body sensing information change monitoring part and that calculates the period of time of movement from the above described room m to room n, any of other than the above described room m, by using the above described absence sensed time in the case that the human body sensing information exhibits present in the above described room n so as to output room IDs of the above described room m, which is the movement origin, and of the above described room n, which is the destination, as well as the above described period of time of movement; a time of movement storage part for receiving and storing an ID of the room of the movement origin and an ID of the room of the movement destination at the time of the exiting of the room as well as a period of time of movement from the non-specified room response sensing part; and a room exit determination part that determines that an exit has not been made from the room in the case that an ID of the room of movement origin, an ID of the room of movement destination and a period of time of movement are not received within the above described predetermined period of time from the above described non-specific room response sensing part and that determines that an exit has been made from the room when the above described period of time of movement agrees with the period of time of movement at the time of exiting from the room in the past stored in the time of movement storage part in the case that the an ID of the room of the movement origin, an ID of the room of the movement destination and a period of time of movement are received within the above described predetermined period of time.

EXPLANATION OF THE NUMERALS

Figure 1:
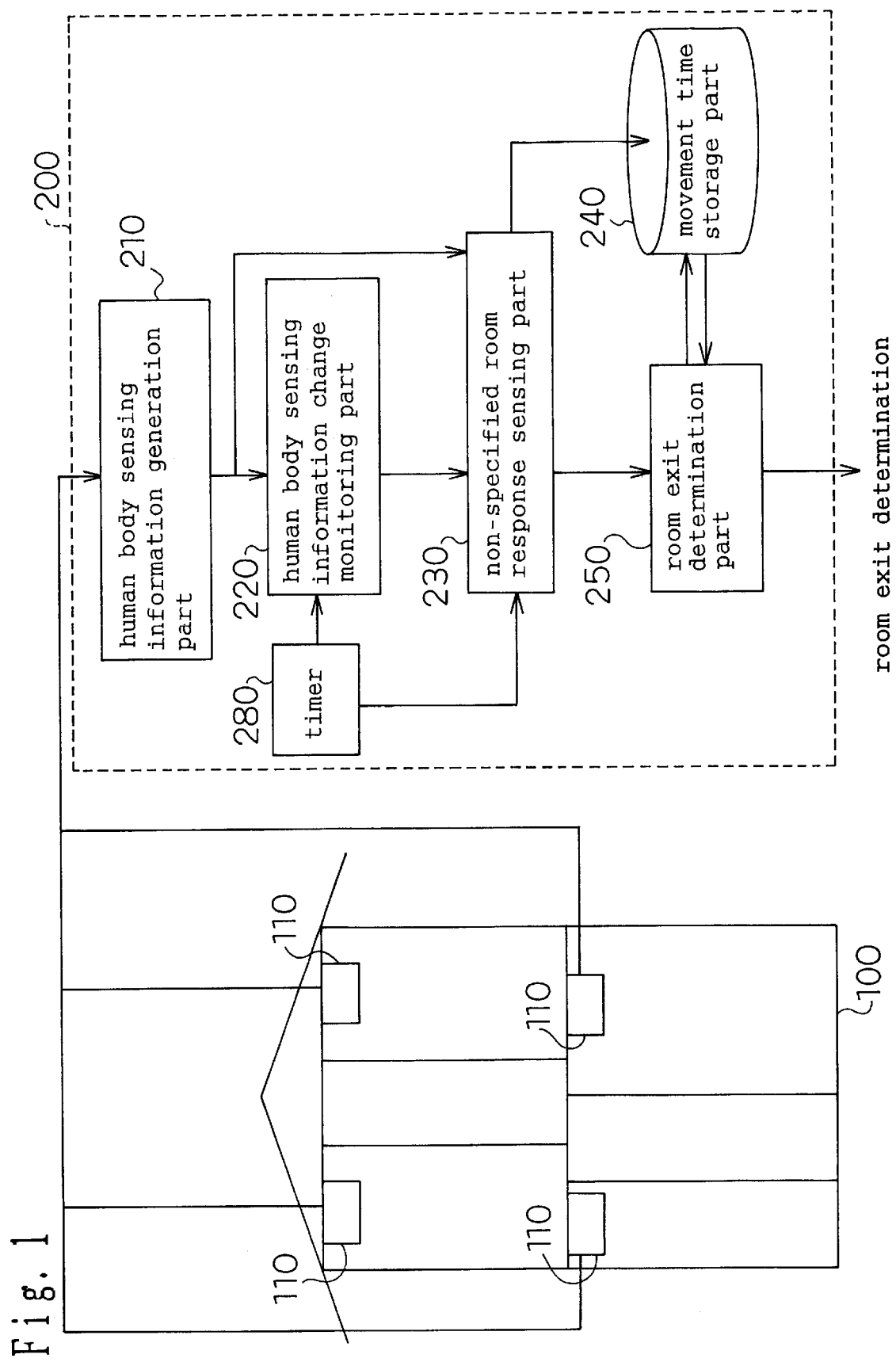
FIG. 1 is a configuration diagram showing the configuration of a human body sensing system according to the first embodiment of the present invention.

100 house
110 human body sensor
200 data processing part
210 human body sensing information generation part
220 human body sensing information change monitoring part
230 non-specified room response sensing part
240 movement time storage part
250 room exit determination part
260 room exit probability calculation part
270 movement pattern learning part
280 timer
290 network communication processing part

PREFERRED EMBODIMENTS FOR CARRYING OUT THE INVENTION

In the following, the embodiments of the present invention are described in reference to the drawings.

(First Embodiment)

FIG. 1 is a configuration diagram showing the configuration of a human body sensing system according to the first embodiment of the present invention. The human body sensing system according to the present embodiment is formed of a plurality of human body sensors 110 installed in respective rooms of a house 100 and a data processing part 200. At least one of the human body sensors 110 is installed in each room and a pyroelectric tremor sensor is, for example, utilized. In a bathroom it maybe a toilet usage switch.

In the data processing part 200, a human body sensing information generation part that acquires output data of all of the human body sensors 110 so as to generate human body sensing information for respective rooms is denoted as 210. A human body sensing information change monitoring part that receives human body sensing information of respective rooms from the human body sensing information generation part 210 and that monitors the human body sensing information changing from presence to absence so as to sense the likelihood of an exit from a room. A non-specified room response sensing part that monitors human body sensing information of the rooms other than a room m in the case that the human body sensing information of room has changed from presence to absence is denoted as 230. In the case that the human body sensing information of a room n, which is different from room m, is presence, a value that corresponds to the time of movement is calculated by using the time when the human body sensing information of the room m changes to absence and the time when the human body sensing information of room n becomes presence. A movement time storage part for storing the time of movement required to move to room n after exiting from room m is denoted as 240. In addition, a room exit determination part for determining an exit from a room with respect to the time of movement that is received from the non-specified room response sensing part 230 in the case that the room of movement origin room m and the room of movement destination is room n is denoted as 250.

Next, the operation of the present embodiment having such a configuration is described.

Output data of the human body sensors 110 is inputted to the human body sensing information generation part 210. The human body sensing information generation part 210 recognizes, in advance, in which room each of the sensors is installed so as to prepare human body sensing information for each room. The human body sensing information is "1" in the case that, for example, a human body sensor 110 senses the movement of a person and outputs data indicating the room state of presence while the human body sensing information is "0" in the case that a human body sensor 110 does not sense the movement of a person and outputs data indicating the room state of absence. The human body sensing information generation part 210 outputs the human body sensing information attaching a room ID to the human body sensing information specific to each room. These pieces of human body sensing information may be outputted at constant time intervals, however, it is preferable to be outputted in the case when the human body sensing information has changed, taking the load of the system into consideration. In the case that this is outputted at constant intervals, the time interval may be approximately one second.

The human body sensing information change monitoring part 220 receives the human body sensing information from the human body sensing information generation part 210 and monitors whether or not there is a room wherein the state changes from presence to absence. In the case that the human body sensing information of a room m has changed from presence to absence, the time Tom of the change to absence is immediately acquired from the timer 280 and the time Tom of the change to absence and the room ID of room m are outputted to the non-specified room response sensing part.

When the non-specified room response sensing part 230 receives the room ID of room m and the time Tom of the change to absence, it collects human body sensing information from the human body sensing information generation part by being triggered by this receipt and checks for the presence state of the rooms other than room m. In the case that there is no response of presence in any room within a predetermined period of time after time Tom of the change to absence in room m, NULL is outputted. On the other hand, in the case that a response of presence in a room n, which is different from room, is detected at time Tin within the predetermined period of time, time Tmn that corresponds to the time of movement between the rooms is calculated by equation 1.

$$Tmn = Tin - Tom \quad \text{(Equation 1)}$$

Here, the above described predetermined period of time requires at least one minute in a standard house. In the case that a human body sensor 110 is provided with a holding function for holding the human body sensing information of presence for a period of time Th after the response of the sensor is complete, Tmn may be represented as in equation 2.

$$Tmn = (Tin - Tom) + Th \quad \text{(Equation 2)}$$

The non-specified room response sensing part 230 outputs the time of movement Tmn, the room ID of room m, which is the movement origin, and the room ID of room n, which is the movement destination.

Next, heuristic data used for room exit determination in the room exit determination part 250 is acquired and is stored in the movement time storage part 240. The heuristic data is made of the room ID of room n, which is the movement destination, and the time of movement Tmn at the time of exit from room m.

Such heuristic data is prepared for use in advance. A concrete technique for acquisition of heuristic data is, for example, to have one person move between the respective rooms within the house without stopping so that the data outputted by the non-specified room response sensing part 230 at this time is stored. In the case that the residents consist of four families, the four families should move between the rooms for the acquisition of the heuristic data in order to increase the determination precision of the room exit determination part 250. The number of pieces of heuristic data needs to be approximately 10, at a minimum, per one movement between rooms. It is desirable that the movement time storage part 240 is a data base that can create a list of the time of movement Tmn corresponding to the room ID of room m, which is the movement origin, and the room ID of room n, which is the movement destination, the combination of which serve as a retrieval key.

After storing the heuristic data in the movement time storage part 240, the output of the non-specified room response sensing part 230 is inputted to the room exit determination part 250. In the case that the output of the non-specified room response sensing part 230 is NULL, the room exit determination part 250 assumes that there is no movement between rooms so as to determine that there has been no exit from the room m, that is to say, the room is in the state of presence. In the case that the room ID of room m, which is the movement origin, the room ID of room n, which is the movement destination, and the time of movement Tmn are received from the non-specified room response sensing part 230, the room IDs of room m and room n are passed to the movement time storage part 240 so that the time of movement stored in the movement time storage part 240 is extracted by using these as a retrieval key. In the case that the time of movement Tmn agrees with the time of movement extracted from the movement time storage part 240 with an error of one second, or less, it is determined that an exit from the room has occurred. In other cases, it is determined that an exit from the room has not occurred.

Here, in the case that a person exits from room m and passes through a corridor and an entrance hall so as to go outside, the non-specified room response sensing part 230 outputs NULL. Accordingly, even though the person has exited from the room m, it is determined that no one has exited from the room. In order to avoid such a determination, a human body sensor 110 may be installed in a place through which a person goes out via the entrance hall.

The human body sensing system of the present embodiment can be used for the control of an apparatus provided in the house 100. For example, it can be utilized for the control of an illumination apparatus such that, in the case that the room exit determination part 250 determines that a person has exited from the room, the illumination apparatus in the room is turned off while, in the case that the room exit determination part 250 determines that no one has exited from the room, the illumination apparatus in the room is left on. In addition, it can be utilized for the control of an air conditioner such that in the case that the room exit determination part 250 has determined that a person has exited from the room the cooling operation of the air conditioner is stopped or the set temperature is increased by two degrees.

As described above, according to the first embodiment of the present invention, in the case that the human body sensing information of a room has converted to absence, the human body sensing information of the other rooms is checked and a determination is made that no one has exited from the room, that is to say, the room is in the state of presence when the human body sensing information of the other rooms has not converted to presence within a predetermined period of time, and furthermore the determination is made that the person has exited from the room only in the case that the time of movement agrees with the time of movement that has been stored in advance, even when the human body sensing information of the other rooms has converted to presence within a predetermined period of time and, therefore, a high precision of human body sensing can be gained.

Here, in the present embodiment, a determination is made that a person has exited from a room in the case that the time of movement Tmn agrees with the time of movement extracted from the movement time storage part 240 with an error of one second or less. Though it has been described that a determination is made that no one has exited from the room in the other cases, a determination may be made that a person has exited in the case that the agreement has an error of two seconds or less, or a determination may be made that a person has exited in the case that the agreement has an error of 1.5 seconds or less. In summary, in the case that the time of movement Tmn substantially agrees with the time of movement extracted from the movement time storage part 240 a determination may be made only that a person has exited from the room and a determination may be made that no one has exited from the room in the other cases.

(Second Embodiment)

Figure 2:
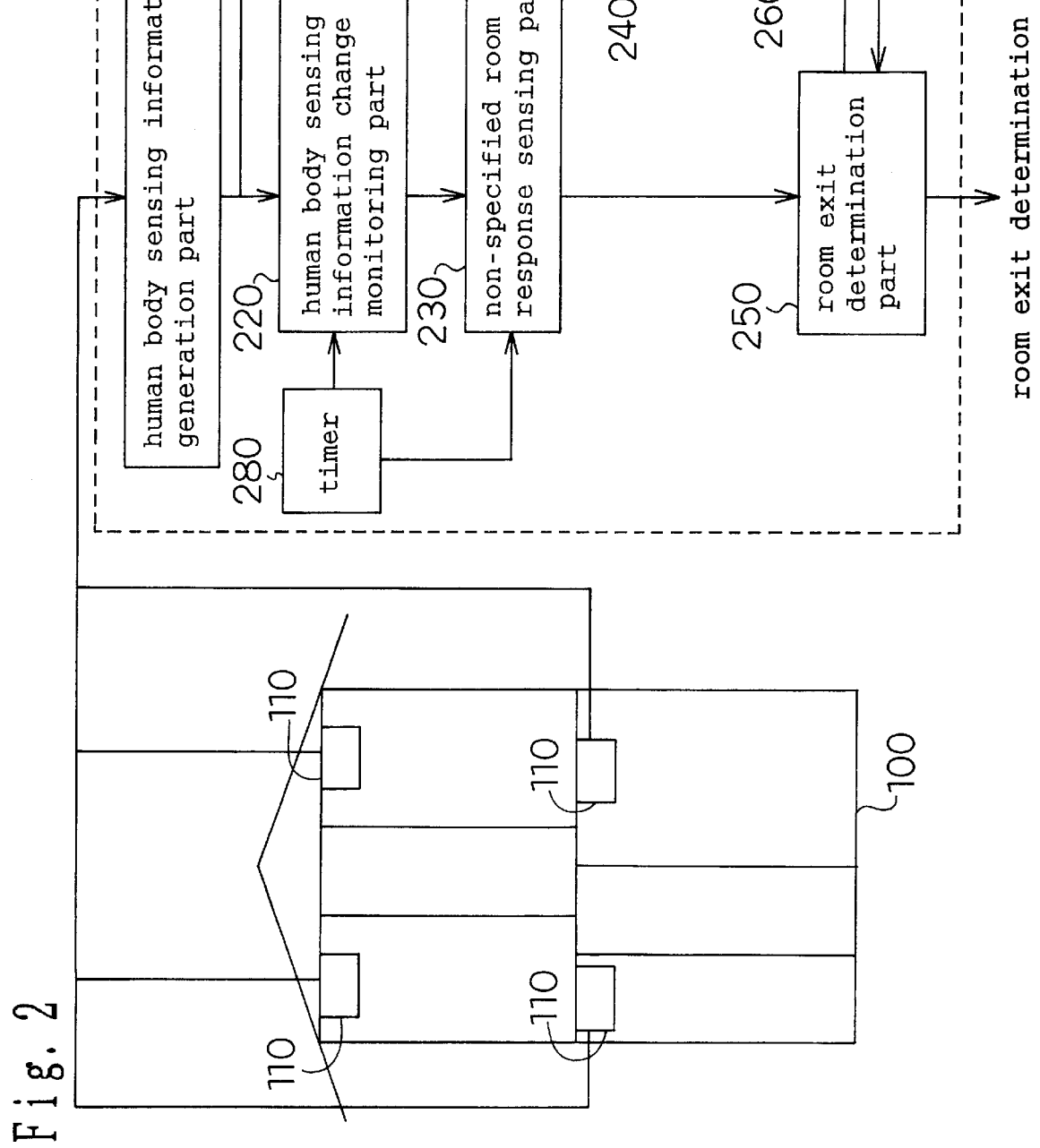
FIG. 2 is a configuration diagram showing the configuration of a human body sensing system according to the second embodiment of the present invention.

In the following, the second embodiment of the present invention is described in reference to FIG. 2. The second embodiment has, in addition to the first embodiment, a room exit probability calculation part 260 that calculates the probability of exit from a room with respect to a movement pattern vector consisting of a room ID of the movement origin that is stored in the movement time storage part 240, and a room ID of the movement destination and the time of movement. The other parts of the configuration are the same as in the first embodiment and the descriptions thereof are omitted. Next, the operation of the present embodiment having such a configuration is described.

The non-specified room response sensing part 230 outputs the time Tom of the change to absence in room m in addition to the room ID of room m, which is the movement origin, the room ID of room n, which is the movement destination, and the time of movement from room m to room n. This time Tom of the change to absence becomes a time stamp in order to know whether or not a person has exited from room m at the time when heuristic data is stored in the movement time storage part 240.

When heuristic data is sorted, the movement time storage part 240 receives the movement pattern vector consisting of the room ID of the movement origin at the time of room exit, the room ID of the movement destination and the time of movement, from the non-specified room response sensing part 230 and stores them in the order of from early to later of the time of the change to absence. In order to recognize data at the time of room exit from among heuristic data, the following technique, for example, is used. During a period of time when heuristic data is stored, the residents record the time when they actually exited from the room for each room. When the period during which heuristic data is stored is completed, the recorded room exit time for each room is compared to the time of change to absence from among data stored in the movement time storage part 240 so as to set a flag in the agreed data as movement pattern vector at the time of room exit.

The room exit probability calculation part 260 receives all the movement pattern vectors stored in the movement time storage part 240 so as to count the number of occurrences at the time of room exit and the total number of occurrences of the movement pattern vectors in accordance with the existence of a flag of the movement pattern vectors at the time of the room exit. In addition, at the same time, a room exit probability that is defined by a value that is gained by dividing the number of occurrences at the time of room exit by the total number of occurrences for each of the movement pattern vectors is calculated and stored.

The heuristic data prepared in such a manner is used for that the room exit determination part 250 to carry out a room exit determination. That is to say, the room exit determination part 250 inputs the room ID of the movement origin, the room ID of the movement destination and the time of movement, which are received from the non-specified room response sensing part 230, to the movement time learning part 240 as a retrieval key and receives the room exit probability from the movement time learning part 240. This is an act of checking the size of the probability of an exit from the room with respect to each of the movement pattern vectors outputted by the non-specified room response sensing part 230. The room exit determination part 250 determines that an exit from the room has occurred in the case that the received probability of an exit from the room is a predetermined value or greater, while it does not determine that an exit from the room has occurred in the case that the probability has not met a predetermined value of the probability of an exit from the room.

Here, a certain period of heuristic data storage is required in order to carry out a room exit determination with a high precision in the room exit determination part 250. A minimum of one week is necessary for this period of time, during which the residents pass their time normally.

As described above, since the probability of the exit from the room is introduced, the present human body sensing system according to the second embodiment can reduce, in comparison with the first embodiment, the possibility of mistaken determination that an exit from a room has occurred in the case wherein this has not actually occurred.

(Third Embodiment)

Figure 3:
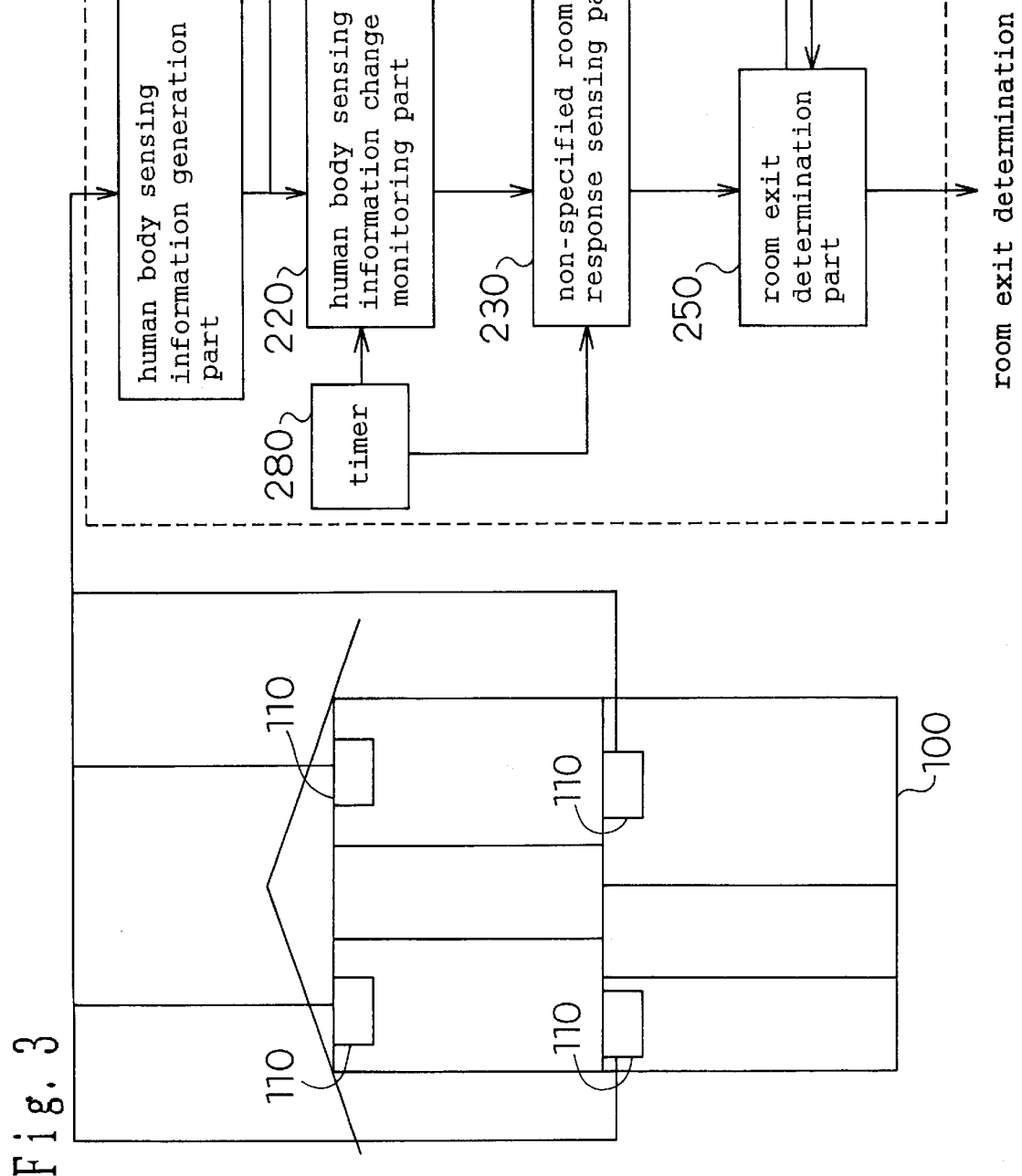
FIG. 3 is a configuration diagram showing the configuration of a human body sensing system according to the third embodiment of the present invention.

In the following, the third embodiment of the present invention is described in reference to FIG. 3. The third embodiment lacks the movement time storage part 240 of the first embodiment and has a movement pattern leaning part 270 that recognizes and learns the movement pattern vectors consisting of the room ID of the movement origin, the room ID of the movement destination and the time of movement received from the non-specified room response sensing part 230. The other parts of the configuration are the same as in the first embodiment and the descriptions thereof are omitted. Next, the operation of the present embodiment having such a configuration is described.

When the non-specified room response sensing part 230 receives the room ID of a room m that has a probability of an exit from the room and the time of the change to absence from the human body sensing information change monitoring part 220, it monitors for a predetermined period of time whether or not the human body sensing information with respect to the rooms other than room m has become presence. In the case that the human body sensing information in a room n, which is a different room from room m, has become presence with in the predetermined period of time, a movement pattern vector is prepared and outputted by extracting an amount of characteristics at the time of an exit from the room about the time of the change to absence.

This movement pattern vector includes not only the room ID of the movement origin, the room ID of the movement destination and the time of movement but, also, includes the amount of characteristics of the movement pattern at the time of exit from the room about the time of the change to absence such as the period of time wherein the human body sensing information continues to be presence before the time of the change to absence in the room of movement origin and the continuous period of time of presence response starting when the human body sensing information has become of presence until it becomes of absence in the room of movement destination.

The movement pattern learning part 270 learns the pattern of the movement pattern vector by receiving this vector from the non-specified room response sensing part 230. As for the learning method, a self-organizing algorithm of Kohonen, for example, is used. In this algorithm, the individual multidimensional movement pattern vectors combine with one of the units arranged in a two-dimensional manner so that the learning proceeds to make the reference vector held by the combined unit become closer to its own vector value. When such learning is repeated many times, the two-dimensionally arranged units with similar elements of reference vectors tend to stick together in a plurality of regions respectively (see "Self-Organization and Associative Memory" by T. Kohonen published by Springer-Verlag, Tokyo (KK) "Application of Self-Organizing Mapping" by Heizo Tokudaka, et al published by Kaibundo Shuppan).

The movement pattern vectors outputted by the non-specified room response sensing part 230 at the time of the exit from room m has similar vector components for the rooms of the movement destinations or are divided into a plurality of groups that have similar vector components. This is because the time of movement at the time of moving from room m to another room or the amount of characteristics at approximately the time of the change to absence in the room m are approximately constant for the respective people even in the case that there are a plurality of residents.

The non-specified room response sensing part 230 outputs the movement pattern vector of the path for exit from the room having the above described characteristics and movement pattern vectors other than those at time of exit from a room and when the learning of the two-dimensionally arranged units held by the movement pattern vector learning part 270 has progressed, one, or more characteristic units appears among the two-dimensionally arranged units. This unit is a unit that is combined to a plurality of movement pattern vectors at the time of exit from the room (hereinafter referred to as room exit unit) that is utilized at the later time of determination of exit from the room. The characteristic of the room exit unit is that the mean quantitative error between the reference vector of the room exit unit and the plurality of movement pattern vectors that are combined with this (mean value of the distances between the vectors) is remarkably small in comparison with the other units (a few percent or less relative to the size of the reference vector). Accordingly, in the process of learning, the room exit unit can be easily determined only by monitoring the mean quantitative error of the two-dimensionally arranged units.

Here, the room exit probability may be calculated in each unit by providing a learning period for specifying a room exit unit and by using the same technique as in the second embodiment so that the unit of which the room exit probability is a predetermined value, or greater, may be allowed to be the room exit unit.

When the room exit determination part 250 receives a movement pattern vector from the non-specified room response sensing part 230, it determines with which unit the above vector combines among the two-dimensionally arranged units held by the movement pattern learning part 270 and self-organized, and determines that exit from the room has occurred in the case that it has combined with the room exit unit.

As described above in the third embodiment, a vector having a greater amount of information than the movement pattern vectors utilized in the first and second embodiments is acquired while the residents go about their lives and the result of learning this vector through the self-organizing algorithm of Kohonen is utilized in the determination of exits from the room and, therefore, human body sensor which is suitable for the actual states of the lives of the residents with a higher precision becomes possible.

(Fourth Embodiment)

Figure 4:
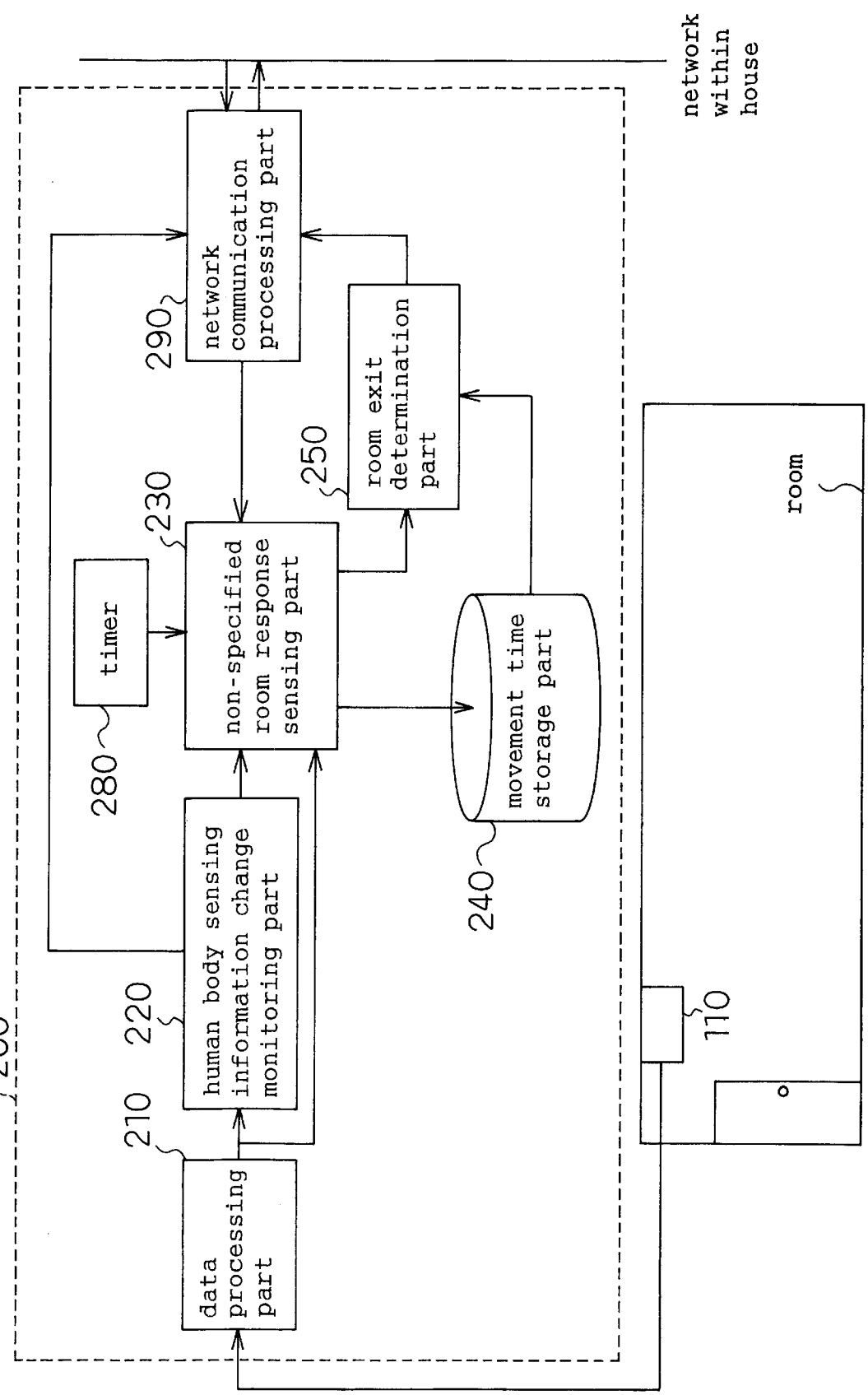
FIG. 4 is a configuration diagram showing the configuration of a human body sensing system according to the fourth embodiment of the present invention.

In the following the fourth embodiment of the present invention is described in reference to FIG. 4. The fourth embodiment has a configuration wherein a network communication processing part 290 that can exchange information with a built-in domestic network in a house is incorporated to the data processing part 200 in the first embodiment so that data processing can be carried out independently in a human body sensor 110 of each room. The network processing part 290 is a means that detects the room ID from the address of the transmission origin when receiving data from the domestic network, adds a room ID to the human body sensing information and passes the information to the non-specified room response sensing part 230. Next, the operation of the present embodiment having such a configuration is described.

A human body sensing information change monitoring part 220 receives human body sensing information from a human body sensing information generation part 210 and monitors a change in the human body sensing information. In the case that the human body sensing information has changed, the latest human body sensing information is passed to the network communication processing part 290 so as to transmit to the network. In addition, in the case that the human body sensing information has changed from presence to absence, the time of change to absence is immediately acquired from a timer 280 so that the time of change to absence is outputted to the non-specified room response sensing part 230.

When the non-specified room response sensing part 230 receives the time of change to absence from the human body sensing information change monitoring part 220, this reception triggers the non-specified room response sensing part to receive human body sensing information of another room from the network communication processing part 290 so as to monitor this information. In the case that human body sensing information does not exhibit presence in any room within a predetermined period of time since the time of change to absence, NULL is outputted. On the other hand, in the case that human body sensing information of another room exhibits presence within the predetermined period of time, the period of time of movement is calculated in the same manner as in the first embodiment so as to output the period of time of movement and the room ID of the movement destination.

Next, heuristic data, which is used for room exit determination in a room exit determination part 250, is acquired and is stored in a movement time storage part 240. The heuristic data contains the ID of the movement destination and the movement period of time at the time of the exit from the room wherein a human body sensor 110 is installed. A concrete method of acquiring heuristic data is the same as in the first embodiment. The movement time storage part 240 stores data in a file format so that the movement period of time can be listed when the room ID of the movement destination is used as a retrieval key.

After storing the heuristic data in the movement time storage part 240, the output of the non-specified room response sensing part 230 is inputted to the room exit determination part 250. In the case that the output of the non-specified room response sensing part 230 is NULL, the room exit determination part 250 assumes that there is no movement between the rooms and determines that no one has exited from the room, that is to say, the room is in the state of presence.

In the case that the room ID of the movement destination and the movement period of time are received from the non-specified room response sensing part 230, a determination is made that the person has exited from the room when this movement period of time agrees with the movement period of time of the heuristic data extracted from the movement time storage part 240 by using the room ID of the movement destination as a retrieval key. Otherwise, a determination is made that no one has exited from the room.

The determination result is passed to the network communication processing part and is allowed to flow through the domestic network. The equipment connected to the domestic network receives the room exit determination result from data processing part 200 of a human body sensor 110 and, thereby, being enabled to carry out a load control.

As described above, in the fourth embodiment of the present invention, the network communication processing part 290 is added to the configuration of the first embodiment so as to be incorporated to a human body sensor 110 of each room as a data processing part and, therefore, it is possible to carry out human body sensing independently in each room in the same manner as in the first embodiment.

Here, though in the present embodiment the network communication processing part 290 is described to be added to the configuration of the first embodiment so as to be incorporated to a human body sensor 110 of each room as a data processing part, the invention is not limited to this. The network communication processing part 290 may be added to the configuration of the second embodiment or of the third embodiment so as to be incorporated to a human body sensor 110 of each room as a data processing part.

Furthermore, though in the present embodiment, the network communication processing part 290 is described to be added to the configuration of the first embodiment so as to be incorporated to a human body sensor 110 of each room as a data processing part 200, the human body sensor 110 and the data processing part 200 can be incorporated as a network adapter in the configuration. Then, such a network adapter can be utilized by being attached to a home electronic appliance such as an air conditioner or a TV.

In this case, by providing an appliance control part for controlling the home electronic appliance to the network adapter, the home electronic appliance to which the network adapter is attached can be controlled based on the processing result of the data processing part 200 that is built into the network adapter.

That is to say, according to the timing wherein the room exit determination part 250 determines that a human body has exited from the room, the appliance control part can carry out energy conservation control by sending a control command to the home electronic appliance, such as an air conditioner.

For example, the appliance control part makes a determination based on the signal sent from the data processing part 200 so as to carry out control based on either presence or absence of a person such that the set temperature of an air conditioner is raised or the power supply is cut off at the time of long-term absence. In addition, the same effects can be expected from a method wherein the air conditioner is operated so that high level operation is turned on and off at constant intervals or from a method according to a rotation system where a plurality of air conditioners carries out, in turn, the above.

In addition, in the case that the room exit determination part 250 of the data processing part 200 determines that a human body has exited from the room, the appliance control part controls the air conditioner so that the set temperature is raised by two degrees while, in the case that a human body has not been sensed during a predetermined period of time, or greater, since the determination was made that the human body exited the room, the power supply of the air conditioner can be controlled so as to be cut off. Then, in the case that a human body is sensed within a predetermined period of time after the determination was made that the human body exited from the room, the air conditioner can be controlled so as to return to the condition before the determination was made that the human body has exited the room. Thus, energy conservation control in two stages achieves to carry out energy conservation control without the frequent turning on and off of the power supply even in a home electronic appliance, such as an air conditioner, of which the frequent turning on and off of the power supply is not convenient. Here, in the case that a human body has not been sensed within a predetermined period of time since the human body has been determined to have exited the room, the air conditioner can be controlled so that the set temperature is raised by two degrees instead of cutting off the power supply of the air conditioner.

Furthermore, the same effects can, of course, be gained even in the case that the function corresponding to the network adapter is incorporated in the home electronic appliance.

Here, such energy conservation control of home electronic appliance is described in detail in the below described fifth embodiment.

(Fifth Embodiment)

Figure 5:
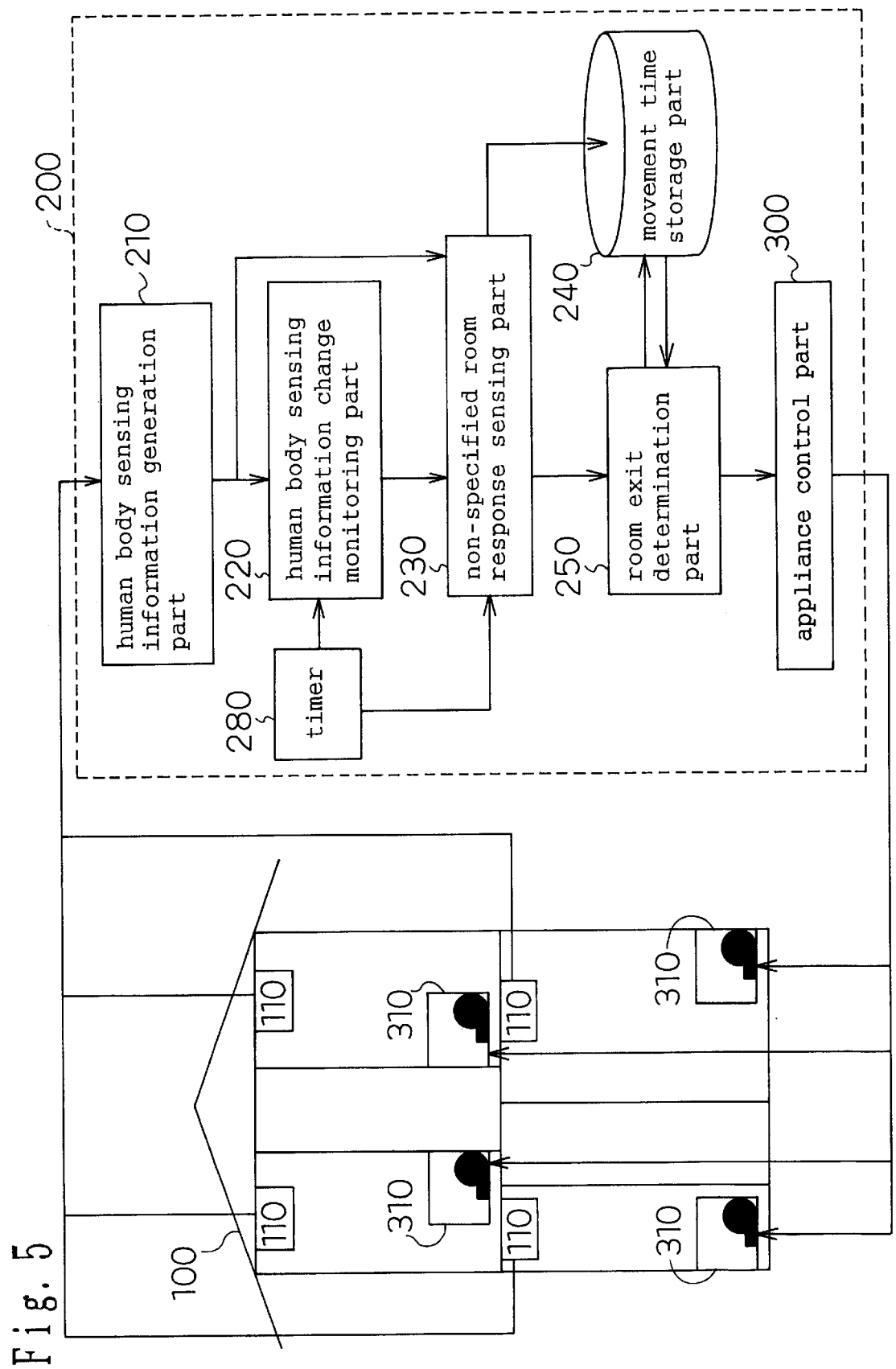
FIG. 5 is a configuration diagram showing the configuration of a human body sensing system according to the fifth embodiment of the present invention.
Figure 6:
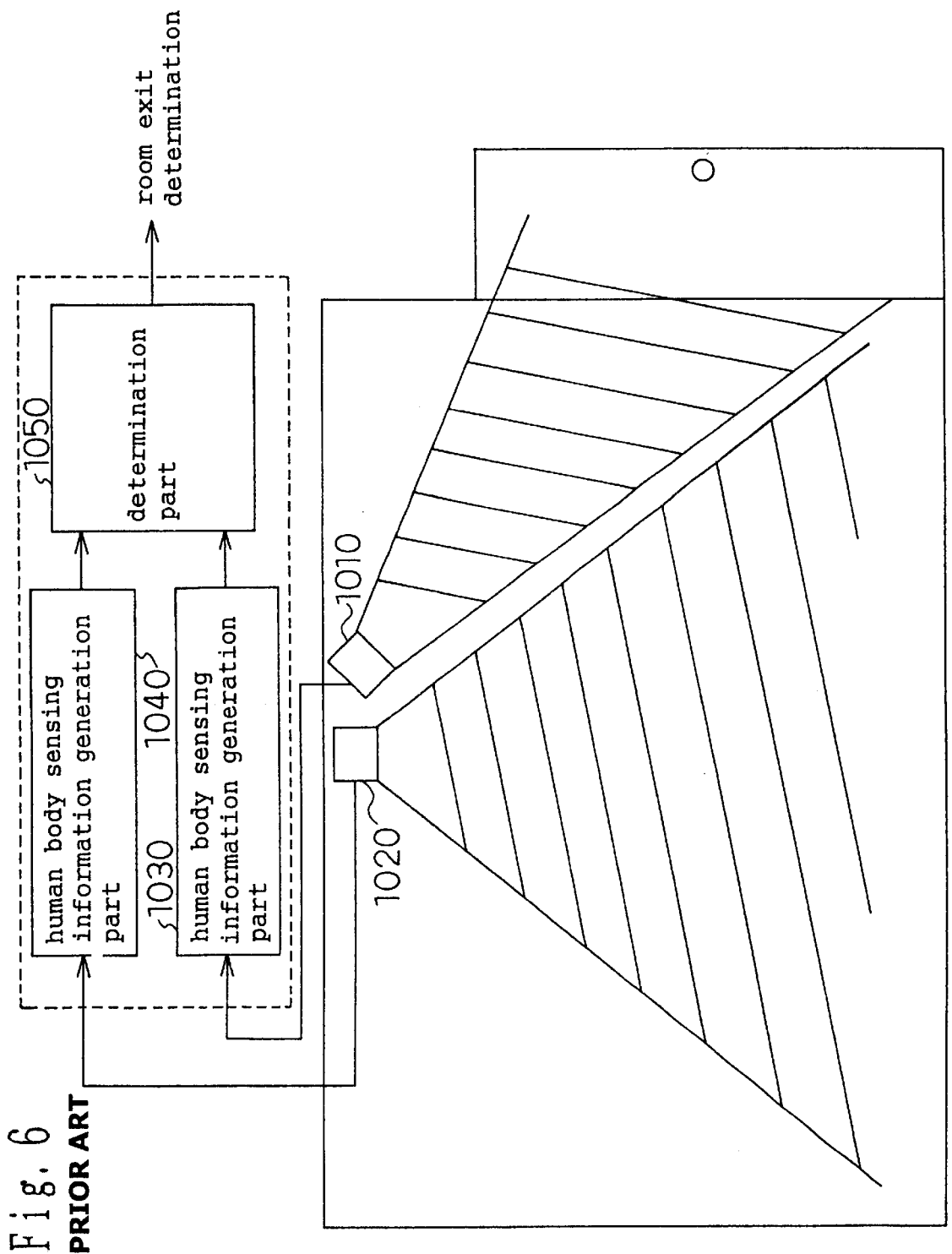
FIG. 6 is a configuration diagram of a technology described in Japanese unexamined patent publication H6 (1994)-230144.

In the following, the fifth embodiment of the present invention is described in reference to FIG. 5.

The difference of the fifth embodiment from the first embodiment is that the data processing part 200 is provided with an appliance control part 300 and an appliance 310 is installed in each of the rooms within the house 100 in the fifth embodiment. That is to say, the appliance control part 300 and each appliance 310 are connected through a network installed within the house 100. The other parts are the same as in the first embodiment.

Next, the operation of the present embodiment having such a configuration is described focusing on the differences from the first embodiment.

In the same manner as in the first embodiment, the human body sensing information change monitoring part 220 is assumed to have specified a room wherein the human body sensor 110 has converted from presence to absence. Then, in the case that the room exit determination part 250 determines that a human body has exited from the specified room, the room exit determination part 250 makes a notification of the room ID of the specified room and that a person has exited the room to the appliance control part 300.

Upon reception of this, the appliance control part 300 controls, in an energy conserving manner, the appliance 310 that is installed in the specified room, based on the room ID of which notification is made from the room exit determination part 250.

That is to say, in the case that the appliance 310 is an air conditioner, the appliance control part 300 controls the set temperature of the air conditioner to be raised two degrees. Then, in the case that the human body sensor 110 still indicates absence after a predetermined period of time, for example 20 minutes, has elapsed since the point in time when the specified room was specified, the power supply of the air conditioner is controlled to be cut off. In addition, in the case that the human body sensor 110 of the specified room indicates presence within a predetermined period of time, for example 20 minutes, since the point in time when the specified room was specified, the appliance control part 300 returns the temperature of the air conditioner to the condition before the room is specified and the appliance control part 300 has carried out the first energy conservation control. That is to say, the air conditioner is controlled so as to lower the temperature setting by two degrees.

The appliance control part 300 carries out such a control by sending a control command to the appliance 310 via the network installed in the house 100.

Thus, the appliance control part 300 carries out two-stage energy conservation control and, therefore, energy conservation control can be carried out without frequently turning the power supply on and off even of the appliance 210, such as an air conditioner, for which it is not convenient to frequently turn the power supply on and off.

In the case that the data processing part 200, which includes such an appliance control part 300, and the human body sensor 110 are formed as a network adapter as described in the fourth embodiment, the power consumption of the appliance 310 can be reduced by simply mounting such a network adapter in the appliance 310. In the same manner, the data processing part 200, which includes the appliance control part 300, and the human body sensor 110 may be directly incorporated in the appliance 310.

In addition, the human body sensor 110 used for such control can also be utilized as a security sensor for the time when the user leaves the house 100 or for an uninhabited room at the same time as such an energy conservation control. Thus, the system can be utilized by being interlocked with the security system.

That is to say, based on the sensing result of the human body sensor 110, a report for disaster prevention or for crime prevention is made. For example, when the human body sensor 110 senses an intruder to a room of the house 100 or the occurrence of a fire, the security means, not shown, sends a report based on the sensed result to the security center with which the user has made a contract in advance that an intruder has invaded the house or that a fire has occurred.

As a result of this, energy conservation effects can be gained in addition to the same effects as in the first embodiment and, furthermore, the effects of disaster prevention and crime prevention can be gained. In addition, instead of utilizing the dedicated sensors for the purpose of energy conservation control and for the purpose of disaster prevention or crime prevention, respectively, the human body sensor 110 is utilized to simultaneously achieve these objectives and, therefore, the cost can be reduced.

As described above, according to the present invention, at least one human body sensor is installed in each of the rooms within a house, the movement pattern, including a period of time of movement between rooms, is learned, and when the human body sensing information of a specific room has converted to absence, the human body sensing information of another room is monitored so as to extract the movement pattern so that a determination is made whether or not an exit from a room has occurred based on the similarity between this movement pattern and the learned movement pattern and, therefore, an inexpensive human body sensing system that can sense a stationary person in a room can be provided.

Here, presence in the present embodiment is an example of the sensed state of the present invention, absence in the present embodiment is an example of the non-sensed state of the present invention, the time of movement, the room ID of room m of the movement origin and the room ID of room n of the movement destination of the present embodiment are examples of the movement pattern of the present invention, the heuristic data of the present embodiment is an example of a reference pattern of the present invention, the movement pattern vector of the present embodiment is an example of the movement pattern of the present invention, the two-dimensionally arranged units that have self-organized according to the heuristic data of the present embodiment are examples of the reference pattern of the present invention, a human body of the present embodiment is an example of an object of the present invention, whether or not a human body has exited a room in the present embodiment is an example of the state of an object of the present invention and a human body sensor of the present embodiment is an example of a moving body sensor of the present invention. In addition, respective rooms with in the house of the present embodiment are examples of two, or more, predetermined regions of the present invention and each room within the house of the present embodiment is also an example of each room within the house of the present invention. In addition, the human body sensing information generation part of the present embodiment is an example of the state sensing information generation part of the present invention and the human body sensing information change monitoring part 220 of the present embodiment is an example of the state sensing information change monitoring part of the present invention. In addition, an appliance control part of the present embodiment is an example of a control part of the present invention, an appliance of the present embodiment is an example of a home electronic appliance of the present invention and an air conditioning function of an air conditioner of the present embodiment is an example of a function part of the present invention.

Furthermore, the house 100 of the present embodiment may be a detached house or may be a unit of rooms within a condominium, an apartment, or the like.

Here, a home electronic appliance of the present invention is not limited to the air conditioner of the present embodiment but, rather, may be a home electronic appliance such as a TV, a radio, a VCR, an illumination apparatus, an electronic kotatsu heater, an air cleaner, a humidifier, a dehumidifier, an air conditioner, an electronic fan heater, or the like. In addition, in the case that the home electronic appliance of the present invention is a TV, the operational condition of the home electronic appliance of the present invention includes the turning on and off of the power supply of the TV, the brightness of the image displayed on the screen of the TV, the sound outputted from a TV speaker(s), and the like; in the case that the home electronic appliance of the present invention is an illumination apparatus, the operational condition of the home electronic appliance of the present invention includes the turning on and off of the power supply for illumination, the intensity of illumination at the time when a room, or the like, is illuminated, and the like; in the case that the home electronic appliance of the present embodiment is an electronic kotatsu heater, the operational condition of the home electronic appliance of the present invention includes the turning on and off of the power supply of the electronic heater, the set temperature of the electronic heater, and the like; and in the case that the home electronic appliance of the present invention is an air conditioner, the operational condition of the home electronic appliance of the present invention includes the turning on and off of the power supply of the air conditioner, the types of operation such as cooling operation, heating operation, dehumidifying operation and air circulation operation, the set temperature of the air conditioner, the turning on and off of the power supply of the air conditioner, the air circulation strength setting of the air conditioner, the direction of air circulation of the air conditioner, and the like.

Furthermore, though in the present embodiment a determination is made whether or not a human body has exited a room, the invention is not limited to this but, rather, a determination can be made whether or not a pet, such as a cat or dog, has exited the room.

Furthermore, though in the present embodiment a determination is made whether or not a human body has exited a room within the house 100, the invention is not limited to this but, rather, it is possible to determine whether or not a human body has exited a room within a warehouse of a factory.

Here, though in the present embodiment a case is described wherein a determination is made whether or not a human body has exited a room, the invention is not limited to this but, rather, a determination can be made whether or not a human body has entered a room. That is to say, the human body sensing information change monitoring part 220 receives human body sensing information generated by the human body sensing information generation part 210 and monitors whether or not there is a room that has changed from absence to presence. Then, in the case that a room which has changed from absence to presence is specified, it can be determined if a human body has newly entered the specified room or if a human body that has been present in the specified room merely made a movement.

In this case, the non-specified room response sensing part 230 checks whether or not there is a room wherein the human body sensing information has changed from presence to absence within a period of time starting from the time when a room is specified as the specified room wherein the human body sensing information has change from absence to presence up to time after a predetermined period of time has elapsed. Then, in the case that such a room is not found, the room is assumed to be a room of movement origin while the room that has changed from the sensed state to the non-sensed is assumed to be a room of movement origin and the period between the time when the room of movement origin has changed to absence and the time when the room is specified as the specified room wherein the human body sensing information has changed from absence to presence is assumed to be a period of time movement, which is compared to a period of time of movement that is stored in advance so that in the case that they substantially agree with each other, a determination is made that a human body has newly entered this specified room while in the case that they do not agree, a determination can be made that a human body merely made a movement in this specified room. Accordingly, in the case that a room entrance determination is carried out, it is necessary to check human body sensing information during a period of time from the time when the room wherein human body sensing information has changed from absence to presence is specified back to the predetermined-period ago and, therefore, the non-specified room response sensing part 230 stores the human body sensing information during the period from the current time back to the predetermined-period ago. Thus, each of the above described embodiments can be interpreted by substituting an entrance for an exit and, thereby, it is clear that each of the above described embodiments can be applied to room entrance determination, of which the detailed descriptions are omitted.

Furthermore, in the case that the room wherein human body sensing information has changed from absence to presence is specified, it is clear that the present embodiment can be applied to presence determination in the room by determining that a human body is merely present in the room.

Here, the present invention is a program for allowing a computer to implement the operation of the entirety of, or part of, the steps (or processes, operations, effects, or the like) of the room presence sensing method of the above described invention and is a program that operates in cooperation with the computer.

Furthermore, the present invention is a medium for holding a program that allows a computer to implement the operation of the entirety of, or part of, the steps of the above described room presence sensing method of the present invention and is a medium that can be read out by a computer and wherein the above described read out program implements the above described operation in cooperation with the above described computer.

Here, apart of means (or apparatus, element, circuit, part, or the like) of the present invention and a part of the steps (or process, operation, effect, or the like) of the present invention indicate several means or steps within a plurality of means or steps or indicate a part of functions or a part of operations within one means or step.

In addition, a recording medium that records a program of the present invention and that can be read by a computer is also included in the present invention.

In addition, one application mode of a program of the present invention may be a mode that is recorded in a recording medium that can be read by a computer and that operates in cooperation with a computer.

In addition, one application mode of a program of the present invention may be a mode that transmits in a transmission medium, that is read by a computer and that operates in cooperation with a computer.

In addition, the data structure of the present invention includes a data base, a data format, a data table, a data list, types of data, and the like.

In addition, the recording medium includes a ROM, and the like, while the transmission medium includes a transmission medium such as the Internet, light, radio waves, sound waves, and the like.

In addition, the above described computer of the present invention is not limited to pure hardware such as a CPU but, rather, may be firmware, an OS or may include a peripheral apparatus.

Here, as described above, the configuration of the present invention may be implemented in a software manner or may be implemented in a hardware manner.

Industrial Applicability

As is clear from the above description, the present invention can provide an object state sensing apparatus, a room presence sensing method, a home electronic appliance, a network adapter and a medium wherein human body sensor precision is high despite a small number of sensors.

What is claimed is:

1. An object state sensing apparatus comprising:
   a state sensing information generation part for generating state sensing information showing a state of an object in two or more rooms in a house by means of moving body sensors installed in the rooms; and
   a determination part for specifying a room wherein said state sensing information has changed and for determining the state of said object in said specified room;
   wherein said state sensing information includes a sensed condition indicating that said object is sensed, and a non-sensed condition indicating that said object is not sensed;
   said determination part includes (a) a state sensing information change monitoring part for specifying a room within said house, where said state sensing information has changed from the sensed condition to the non-sensed condition, and (b) a non-specified room response sensing part for finding a movement pattern between respective rooms, when said state sensing information change monitoring part specifies a room that has changed from the sensed condition to the non-sensed condition;
   a room exit determination part for determining that the object exited from said specified room by comparing said found movement pattern to a reference movement pattern wherein the comparison of said found movement pattern to said reference movement pattern indicates a movement between the respective rooms; and
   said non-specified room response sensing part assumes the room, where said state sensing information has converted to the sensed condition from the non-sensed condition, to be a movement destination room and the period of time between the time when the non-sensed condition is specified in said room that has changed from the sensed condition to the non-sensed condition and the time when said movement destination room is converted to the sensed condition to be a movement period of time, and
   said found movement pattern includes an ID of said specified room, an ID of said movement destination room and said movement period of time.

2. The object state sensing apparatus according to claim 1, wherein
   said reference movement pattern includes the ID of said specified room, the ID of said movement destination room and a reference period of time, measured in advance, required for the object to move from said specified room to said movement destination rooms, and
   said determination part includes determination means to determine that said object exited from the room if said movement period of time of said found movement pattern is substantially equal to said reference period of time of said reference movement pattern.

3. The object state sensing apparatus according to claim 2, wherein
   said reference movement pattern includes a probability of said object exiting from said specified room, and
   said determination means determines that said object exited from the room if said probability of said reference movement pattern is greater than a predetermined value.

4. The object state sensing apparatus according to claim 1, including a movement pattern learning part for learning said reference movement pattern,
   wherein said reference movement pattern is a result of learning in said movement pattern learning part and
   said determination means determines based on a learning value corresponding to said reference movement pattern.

5. The object state sensing apparatus according to claim 4, wherein said movement pattern learning part learns by using a self-organizing algorithm.

6. The object state sensing apparatus according to claim 2 or 3, wherein said reference movement pattern is a reference pattern specified by the ID of said specified room and by the ID of said movement destination room.

7. The object state sensing apparatus according to claim 1, wherein said state sensing information generation part generates said state sensing information of each of said rooms from response of a moving body sensor of each of said rooms, and said determination part has a state sensing information change monitoring part for specifying a room, from among the respective rooms within said house, wherein said state sensing information changed from the non-sensed condition to the sensed condition.

8. A home electronic appliance comprising:

an object state sensing apparatus according to any of claims 1 or 5 and a control part for changing the operational condition of said home electronic appliance if said determination part determines that said object exited from said specified room.

9. The home electronic appliance according to claim 8, wherein said home electronic appliance is an air conditioner.

10. The home electronic appliance according to claim 8, wherein said control part changes the operational condition of said home electronic appliance in said specified room to a first operational condition if said determination part determines that said object exited from said specified room, said control part changes the operational condition of said home electronic appliance to a second operational condition that is different from said first operational condition if said state sensing information in said specified room is in a condition of non-sensed state for a predetermined period of time, or longer, since a determination is made that said object exited from the specified room, and said control part returns the operational condition of said home electronic appliance to the operational condition before the change to said first operational condition if said state sensing information of said specified room is converted from the non-sensed state to the sensed state within said predetermined period of time.

11. A network adapter comprising:

an object state sensing apparatus according to any of claims of 1 to 5;

said moving body sensors; and a communication part for communicating with a home electronic appliance having a function part that performs predetermined functions based on a determination result of said object state sensing apparatus.

12. The network adapter according to claim 11, comprising a control part for changing an operational condition of said function part if said determination part determines that said object exited from said specified room.

13. The network adapter according to claim 12, wherein said control part changes the operational condition of said function part in said specified room to a first operational condition if said determination part determines that said object exited from said specified room, said control part changes the operational condition of said function part to a second operational condition that is different from said first operational condition if said state sensing information in said specified room is in a condition of non-sensed state for a predetermined period of time, or longer, since said determination is made that an exit from the room occurred, and said control part returns the operational condition of said function part to the operational condition before the change to said first operational condition if said state sensing information of said specified room is converted from the non-sensed state to the sensed state within said predetermined period of time.

14. In a structure having multiple rooms, a method for sensing a body exiting from a room comprising the steps of:

(a) identifying at least first and second rooms in the structure with first and second IDs, respectively;

(b) sensing presence of a body in the first room;

(c) sensing a change in step (b) by a non-sensing of the body in the first room;

(d) sensing presence of a body in the second room;

(e) determining at least one movement pattern between the first room having the first ID and the second room having the second ID, including a movement period of time between sensing of change in step (c) and first sensing of presence of a body in step (d);

(f) determining, in advance, a predetermined reference movement pattern from the first room to the second room, including a movement period of time for moving from the first room to the second room; and (g) comparing the movement patterns of step (e) and step (f) to determine that a body exited from the first room and is in the second room.

15. An apparatus for sensing a body exiting a room of a structure comprising:

an identifier identifying at least first and second rooms in the structure with first and second IDs, respectively, a first sensor sensing presence of a body in the first room and, subsequently, sensing a change, after non-sensing of the body in the first room, a second sensor sensing presence of a body in the second room, a memory storing a predetermined reference movement pattern from the first room to the second room, including a movement period of time for moving from the first room to the second room, a calculator determining at least one movement pattern between the first room having the first ID and the second room having the second ID, including a movement period of time between sensing of change of the first sensor and first sensing of presence of a body in the second room, and a comparator comparing the predetermined reference movement pattern with the at least one movement pattern to determine that a body exited from the first room and is in the second room.

16. A machine-readable storage medium containing a set of instructions for causing a general purpose computer to determine that a body exited a room in a structure, by performing the following steps:

(a) identifying at least first and second rooms in the structure with first and second IDs, respectively;

(b) sensing presence of a body in the first room;

(c) sensing a change in step (b) by a non-sensing of the body in the first room;

(d) sensing presence of a body in the second room;

(e) determining at least one movement pattern between the first room having a first ID and the second room having a second ID, including a movement period of time between sensing of change in step (c) and first sensing of presence of a body in step (d);

(f) determining, in advance, a predetermined reference movement pattern from the first room to the second room, including a movement period of time for moving from the first room to the second room; and (g) comparing the movement patterns of step (e) and step (f) to determine that a body exited from the first room and is in the second room.

* * * * *

UNITED STATES PATENT AND TRADEMARK OFFICE
CERTIFICATE OF CORRECTION

PATENT NO. : 6,754,561 B2
DATED : June 22, 2004
INVENTOR(S) : Masaru Matsui et al.

It is certified that error appears in the above-identified patent and that said Letters Patent is hereby corrected as shown below:

Title page,
Item [56], References Cited, FOREIGN PATENT DOCUMENTS, delete "JP 06-230144  8/1994".

Column 26,
Line 40, "rooms" should read -- room --.

Column 27,
Line 8, between "from" and "response", insert -- a --.
Line 17, "or" should read -- to --.

Signed and Sealed this

Twenty-eighth Day of December, 2004

JON W. DUDAS
*Director of the United States Patent and Trademark Office*